(12) United States Patent
Lucchi et al.

(10) Patent No.: US 12,273,601 B2
(45) Date of Patent: Apr. 8, 2025

(54) LIVE VIDEO STREAMING ARCHITECTURE WITH REAL-TIME FRAME AND SUBFRAME LEVEL LIVE WATERMARKING

(71) Applicant: Infrared5, Inc., Jamaica Plain, MA (US)

(72) Inventors: Davide Lucchi, Boston, MA (US); Chris Allen, Jamaica Plain, MA (US); Alexander Solonsky, Tomsk (RU)

(73) Assignee: Infrared5, Inc., Jamaica Plain, MA (US)

( * ) Notice: Subject to any disclaimer, the term of this patent is extended or adjusted under 35 U.S.C. 154(b) by 238 days.

(21) Appl. No.: 17/550,472

(22) Filed: Dec. 14, 2021

(65) Prior Publication Data
US 2022/0201372 A1    Jun. 23, 2022

Related U.S. Application Data

(60) Provisional application No. 63/129,711, filed on Dec. 23, 2020.

(51) Int. Cl.
  *H04N 21/8358* (2011.01)
  *G06T 1/00* (2006.01)
  (Continued)

(52) U.S. Cl.
  CPC ....... *H04N 21/8358* (2013.01); *G06T 1/0085* (2013.01); *H04L 65/65* (2022.05);
  (Continued)

(58) Field of Classification Search
  CPC ........... H04N 21/8358; H04N 21/2187; H04N 21/23892; H04N 21/64322; G06T 1/0085;
  (Continued)

(56) References Cited

U.S. PATENT DOCUMENTS

| | | |
|---|---|---|
| 8,019,867 B1 | 9/2011 | Allen et al. |
| 8,019,878 B1 | 9/2011 | Allen et al. |

(Continued)

FOREIGN PATENT DOCUMENTS

| | | |
|---|---|---|
| AU | 2018257929 B2 | 7/2022 |
| AU | 2022252735 A1 | 11/2022 |

(Continued)

OTHER PUBLICATIONS

USPTO, "International Search Report and Written Opinion", International Application No. PCT/US2021/063282, May 4, 2022, 15 Pages.

(Continued)

*Primary Examiner* — Taghi T Arani
*Assistant Examiner* — Blake I Narramore
(74) *Attorney, Agent, or Firm* — Outside General Counsel LLP; Peter Gordon (57) ABSTRACT

A live media streaming architecture with real-time live watermarking wherein watermarks are added at a frame or subframe level. The architecture can use a UDP/WebRTC architecture, without requiring a content delivery network, which is not dependent on transmitting media by segments, thus allowing insertion of the watermark at a frame or subframe level. By inserting watermarks at a frame or subframe level, latency is minimized for media delivery to under 500 milliseconds (ms) and for extraction to about five to fifteen seconds.

16 Claims, 8 Drawing Sheets

Server Side Watermarking (51) Int. Cl.
*H04L 65/65* (2022.01)
*H04L 67/55* (2022.01)
*H04N 21/2187* (2011.01)

(52) U.S. Cl.
CPC ......... *H04L 67/55* (2022.05); *H04N 21/2187* (2013.01); *G06T 2201/0065* (2013.01)

(58) Field of Classification Search
CPC . G06T 2201/0065; H04L 65/65; H04L 67/55; H04L 65/61; H04L 65/75
See application file for complete search history.

(56) References Cited

U.S. PATENT DOCUMENTS

| | | | |
|---|---|---|---|
| 8,024,469 B1 | 9/2011 | Allen et al. | |
| 8,166,181 B2 | 4/2012 | Allen et al. | |
| 8,171,145 B2 | 5/2012 | Allen et al. | |
| 8,695,048 B1 | 4/2014 | Kellicker | |
| 8,732,775 B2 | 5/2014 | Kellicker | |
| 8,752,113 B1 | 6/2014 | Good et al. | |
| 8,776,101 B2 | 7/2014 | Donoghue et al. | |
| 8,782,721 B1 | 7/2014 | Kellicker | |
| 8,782,722 B1 | 7/2014 | Kellicker | |
| 9,043,845 B2 | 5/2015 | Davis et al. | |
| 9,100,461 B2 | 8/2015 | Lemmons et al. | |
| 9,124,910 B2 | 9/2015 | Kellicker | |
| 9,226,048 B2 | 12/2015 | Messmer et al. | |
| 9,319,626 B2 | 4/2016 | Kellicker | |
| 9,350,780 B2 | 5/2016 | Good et al. | |
| 9,686,593 B2 | 6/2017 | Kellicker | |
| 9,769,612 B1 | 9/2017 | Owen | |
| 9,774,914 B2 | 9/2017 | Riegel et al. | |
| 10,236,031 B1* | 3/2019 | Gurijala ................ G10L 19/018 | |
| 10,278,018 B2 | 4/2019 | Owen | |
| 10,298,387 B1 | 5/2019 | Good | |
| 10,306,293 B2 | 5/2019 | Talvensaari et al. | |
| 10,313,758 B2 | 6/2019 | Riegel et al. | |
| 10,601,914 B2 | 3/2020 | Birrer et al. | |
| 10,602,310 B2 | 3/2020 | Owen | |
| 10,855,763 B2 | 12/2020 | Birrer et al. | |
| 10,944,999 B2 | 3/2021 | Nicol et al. | |
| 10,986,421 B2 | 4/2021 | Master et al. | |
| 11,032,348 B2 | 6/2021 | Kellicker et al. | |
| 11,051,049 B2 | 6/2021 | Bustamante et al. | |
| 11,363,314 B2 | 6/2022 | Nicol et al. | |
| 11,470,361 B2 | 10/2022 | Bustamante et al. | |
| 11,490,132 B2 | 11/2022 | Bustamante et al. | |
| 11,612,813 B2 | 3/2023 | Hooks et al. | |
| 2011/0283328 A1 | 11/2011 | Davis et al. | |
| 2012/0166289 A1 | 6/2012 | Gadoury et al. | |
| 2012/0222056 A1 | 8/2012 | Donoghue et al. | |
| 2012/0308071 A1 | 12/2012 | Ramsdell et al. | |
| 2012/0315011 A1 | 12/2012 | Messmer et al. | |
| 2013/0151856 A1 | 6/2013 | Petrovic et al. | |
| 2013/0305281 A1 | 11/2013 | Cansler et al. | |
| 2014/0109157 A1 | 4/2014 | Kellicker | |
| 2014/0109158 A1 | 4/2014 | Kellicker | |
| 2014/0208373 A1 | 7/2014 | Kellicker | |
| 2014/0281007 A1 | 9/2014 | Lemmons et al. | |
| 2014/0281014 A1 | 9/2014 | Good et al. | |
| 2014/0300813 A1 | 10/2014 | Kellicker | |
| 2015/0026743 A1 | 1/2015 | Kim et al. | |
| 2016/0105428 A1* | 4/2016 | Schrempp ............ H04L 65/611 726/7 |
| 2016/0150297 A1 | 5/2016 | Petrovic et al. | |
| 2016/0192023 A1 | 6/2016 | Kellicker | |
| 2017/0064400 A1 | 3/2017 | Riegel et al. | |
| 2017/0076522 A1* | 3/2017 | Ives-Halperin ..... H04W 12/084 | |
| 2017/0171611 A1* | 6/2017 | Nair .................... H04N 21/4408 | |
| 2017/0366856 A1 | 12/2017 | Riegel et al. | |
| 2018/0054707 A1 | 2/2018 | Owen | |
| 2018/0131900 A1* | 5/2018 | Talbot ............... H04M 3/42391 |
| 2018/0288369 A1 | 10/2018 | Gaebel et al. | |
| 2018/0309827 A1 | 10/2018 | Birrer et al. | |
| 2019/0007754 A1 | 1/2019 | Master et al. | |
| 2019/0028465 A1 | 1/2019 | Allen et al. | |
| 2019/0028758 A1 | 1/2019 | Talvensaari et al. | |
| 2019/0182554 A1* | 6/2019 | Schupak ............ H04N 21/2343 |
| 2019/0215540 A1 | 7/2019 | Nicol et al. | |
| 2019/0246146 A1 | 8/2019 | Bustamante et al. | |
| 2019/0253839 A1 | 8/2019 | Owen | |
| 2019/0313161 A1* | 10/2019 | Wilms ............... H04N 21/8456 |
| 2019/0320004 A1 | 10/2019 | Allen et al. | |
| 2019/0320014 A1 | 10/2019 | Allen et al. | |
| 2019/0356966 A1* | 11/2019 | Zuydervelt ........ H04N 21/4825 |
| 2020/0059693 A1* | 2/2020 | Neumeier .......... H04N 21/4383 |
| 2020/0186601 A1 | 6/2020 | Birrer et al. | |
| 2020/0221112 A1* | 7/2020 | Braudaway ........... G06T 1/0085 |
| 2020/0322412 A1 | 10/2020 | Kellicker et al. | |
| 2020/0372546 A1 | 11/2020 | Maher et al. | |
| 2021/0084389 A1* | 3/2021 | Young ................. H04N 21/8547 |
| 2021/0093967 A1 | 4/2021 | Hooks et al. | |
| 2021/0204003 A1 | 7/2021 | Nicol et al. | |
| 2021/0289236 A1 | 9/2021 | Bustamante et al. | |
| 2021/0311910 A1* | 10/2021 | Calveley ............. G11B 27/031 |
| 2021/0352337 A1 | 11/2021 | Bustamante et al. | |
| 2021/0400142 A1 | 12/2021 | Jorasch et al. | |
| 2022/0007083 A1* | 1/2022 | Lin .................. H04N 21/23892 |
| 2022/0078514 A1 | 3/2022 | Bustamante et al. | |
| 2022/0303593 A1 | 9/2022 | Nicol et al. | |
| 2022/0321945 A1 | 10/2022 | Allen et al. | |
| 2023/0070531 A1 | 3/2023 | Bustamante et al. | |
| 2023/0156246 A1 | 5/2023 | Bustamante et al. | |
| 2023/0319334 A1 | 10/2023 | Donoghue et al. | |

FOREIGN PATENT DOCUMENTS

| | | |
|---|---|---|
| CA | 3089963 A1 | 8/2019 |
| CA | 3059564 C | 12/2020 |
| EP | 2540072 B1 | 4/2014 |
| EP | 3488439 B1 | 8/2021 |
| EP | 3750301 B1 | 6/2023 |
| EP | 4209002 A1 | 7/2023 |
| EP | 3923269 B1 | 11/2023 |
| WO | 2011/103075 A1 | 8/2011 |
| WO | 2018/017878 A1 | 1/2018 |
| WO | 2018/200184 A1 | 11/2018 |
| WO | 2019/157082 A1 | 8/2019 |
| WO | 2020036796 A1 | 2/2020 |
| WO | 2022/051612 A1 | 3/2022 |
| WO | 2022/140111 A1 | 6/2022 |
| WO | 2022/216663 A1 | 10/2022 |

OTHER PUBLICATIONS

PCT, "International Preliminary Report on Patentability", International Application No. PCT/US2022/023418, Oct. 19, 2023, 11 pages.
U.S. Patent and Trademark Office, "Non-Final Office Action Received", U.S. Appl. No. 17/713,401, filed Oct. 13, 2023, 12 pages.
"3 Pitfalls to Server-Side Ad Insertion Architecture", RED5 Pro, red5pro.com, Mar. 29, 2021, retrieved on [Mar. 6, 2022). Retrieved from the internet <URL: https://www.red5pro.com/blog/3-pitfalls-to-server-side-ad-Insertion-architecture/> entire document, 4 pages.
PCT, "International Preliminary Report on Patentability", International Application No. PCT/US2021/063282, Jul. 6, 2023, 7 Pages.
PCT, "International Search Report and Written Opinion Received", International Application No. PCT/US2022/023418, Jun. 24, 2022, 29 Pages.
U.S. Patent and Trademark Office , "Final Office Action", U.S. Appl. No. 17/713,401, mailed Jun. 24, 2024, 9 Pages.
U.S. Patent and Trademark Office , "Notice of Allowance Received", U.S. Appl. No. 17/713,401, filed Nov. 15, 2024, 7 Pages.

* cited by examiner

FIG. 1A — Server Side Watermarking

FIG. 1B — Client Side Watermarking

LIVE VIDEO STREAMING ARCHITECTURE WITH REAL-TIME FRAME AND SUBFRAME LEVEL LIVE WATERMARKING

CROSS-REFERENCE TO RELATED APPLICATIONS

This application is a nonprovisional patent application of, and claims the benefit under 35 USC § 119 to, prior filed U.S. provisional patent application Ser. No. 63/129,711, entitled "LIVE VIDEO STREAMING ARCHITECTURE WITH REAL-TIME FRAME AND SUBFRAME LEVEL LIVE WATERMARKING", filed Dec. 23, 2020, which is hereby incorporated by reference.

BACKGROUND

Watermarking is a well-known means for allowing copyright owners to detect copies of their content. There are a variety of techniques for inserting and extracting watermarks from digital media. Watermarking generally can be performed on a server computer from which digital media is transmitted (herein called server-side watermarking), or a client device where the digital media is presented. The difference is where the mark is applied. Server-side watermarking is becoming more common in content industries such as live sports. In such applications low latency and fast extraction can be important factors. Many current server-side watermarking approaches for live digital media transmissions are focused on the transmission control protocol/hypertext transfer protocol (TCP/HTTP) way of delivering media data using content delivery networks (CDNs) which imposes several limitations, particularly latency of media delivery and latency of extraction. Current techniques typically introduce a latency at least five seconds of delay in media delivery when using low latency HTTP-based protocols like common media application format (CMAF) or low latency HTTP live streaming (LL-HLS) with prefetching and chunked transfer delivery, or anywhere between 10 to 60 seconds when using the HTTP live streaming (HLS) protocol or the Dynamic Adaptive Streaming over HTTP (DASH, also known as "MPEG-DASH") protocol. Moreover, they require an extraction time of at least five to fifteen minutes. This latency is due in part to the restriction that a watermark can only be applied to large segments of the transmitted data, such as used in the HLS protocol or DASH protocol. The significant latency in extraction time limits the capability of the content owner to respond to the detection of unauthorized content in a timely manner.

SUMMARY

This Summary introduces a selection of concepts in simplified form that are described further below in the Detailed Description. This Summary neither identifies key or essential features, nor limits the scope, of the claimed subject matter.

A live media streaming architecture, with real-time live watermarking, is provided which allows the watermark to be inserted in real time at the frame and even subframe level. In implementations which use a user datagram protocol/web real-time communication (UDP/WebRTC) architecture, without requiring a CDN, latency for media delivery can be reduced to under 500 milliseconds (ms), and the extraction time can be reduced to about five to fifteen seconds. This latency is in part possible because the UDP/WebRTC architecture is not dependent on segments, or is unsegmented, allowing watermarks to be added at the frame or subframe level.

In some implementations, a watermark is visible. In some implementations, a watermark is invisible. In some implementations, both visible and invisible watermarks can be included. The watermark can be added at a frame level and even a subframe level. In some implementations, a watermark is informative, such as logo. In some implementations, a watermark is forensic, allowing for a reliable identification of a subscriber or a republisher. The watermark can carry side information, e.g., metadata, regarding the watermarked digital media. In some implementations, the watermark is inserted in the baseband domain. In some implementations, the watermark is inserted in the compressed domain. The watermark can be inserted in an audio stream, or in a video streams, or in other digital media streams such as metadata or still images, or in a combination of one or more digital media streams. The watermark can be designed to identify a subscriber, where a subscriber is someone who acquired permission to view a stream, such as through an authentication or pay per view system. The watermark can be designed to identify a republisher, where a republisher is someone who acquired permission to republish a stream to subscribers, such as through an authentication or pay per view system.

The watermark extraction process can be blind (without access to the original digital media), non-blind (with access to the original digital media), or informed (using some information extracted from the original digital media at the stage of creating watermark).

Ingress of the original digital media may come from any of a variety of sources, such as video on demand (VOD) sources, serial, or parallel digital delivery interfaces, or through live delivery over protocols like WebRTC, SRT, RTSP, RTMP, MPEG-TS, or any other network delivery.

Egress of the watermarked content may go through any channel of an over-the-top (OTT) media delivery platform, while currently the lowest latency with widest support is achievable through WebRTC. An OTT platform is a service that enables delivery of live digital media streams, such as video, to any internet-enabled device.

Any aspect of this architecture can be embodied as a computer system, as a component of such a computer system, as a process performed by such a computer system or a component of such a computer system, or as an article of manufacture including computer storage in which computer program code is stored and which, when processed by the processing system(s) of one or more computers, configures the processing system(s) of the one or more computers to provide such a computer system or a component of such a computer system.

The following Detailed Description references the accompanying drawings which form a part this application, and which show, by way of illustration, specific example implementations. Other implementations may be made without departing from the scope of the disclosure.

DETAILED DESCRIPTION

Figure 1A:
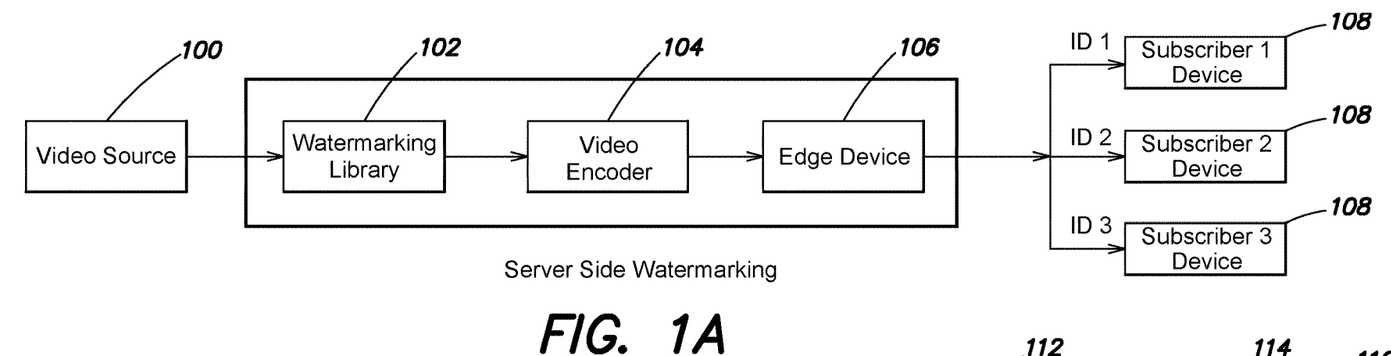
FIG. 1A illustrates an example implementation of a server-side watermarking architecture.
Figure 1B:
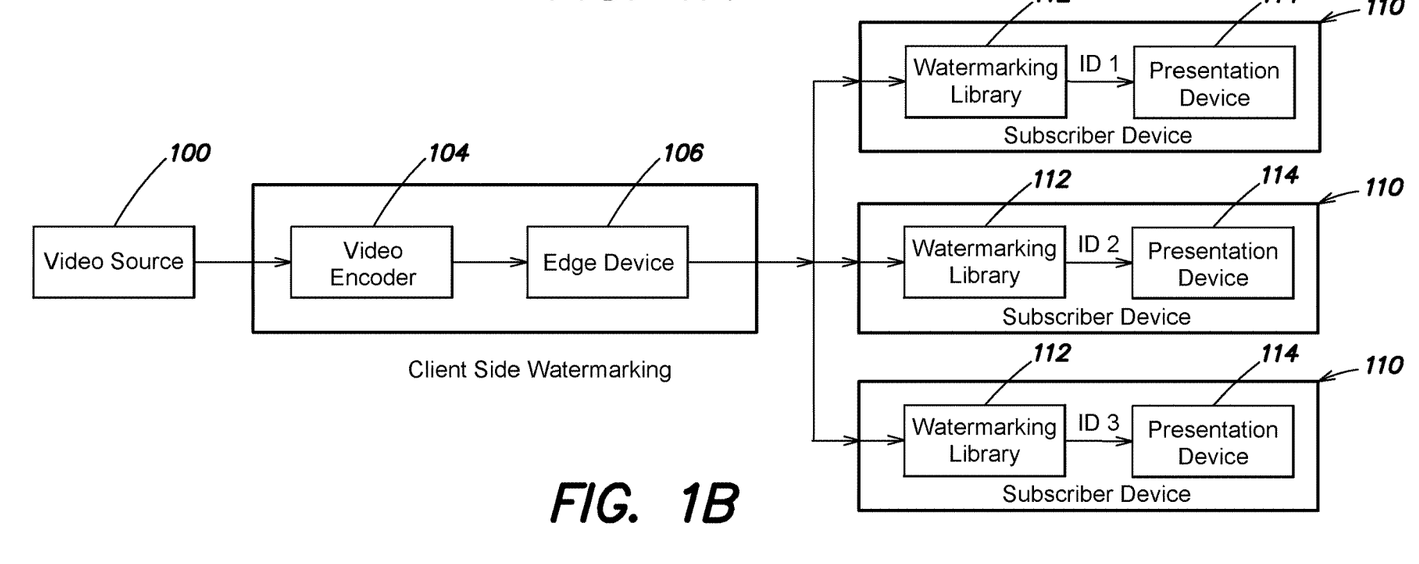
FIG. 1B illustrates an example implementation of a client-side watermarking architecture.

Referring to FIGS. 1A and 1B, server-side and client-side watermarking implementations are shown. In server-side watermarking in FIG. 1A, a video source 100 provides video to a watermarking library 102 which applies the watermark. The watermarked video is input to a video encoder 104 which provides encoded video to an edge device 106. The edge device 106 transmits the encoded video to subscriber devices 108 which present the video to a subscriber. In client-side watermarking in FIG. 1B, a video source 100 provides video to a video encoder 104 which provides encoded video to an edge device 106. The edge device 106 transmits the encoded video to subscriber devices 110, each of which includes a respective watermarking library 112 which applies the watermark. The watermarked video is presented on a presentation device 114 of the subscriber device 110. It should be understood that such watermarking also can be applied to audio or other digital media.

Figure 2:
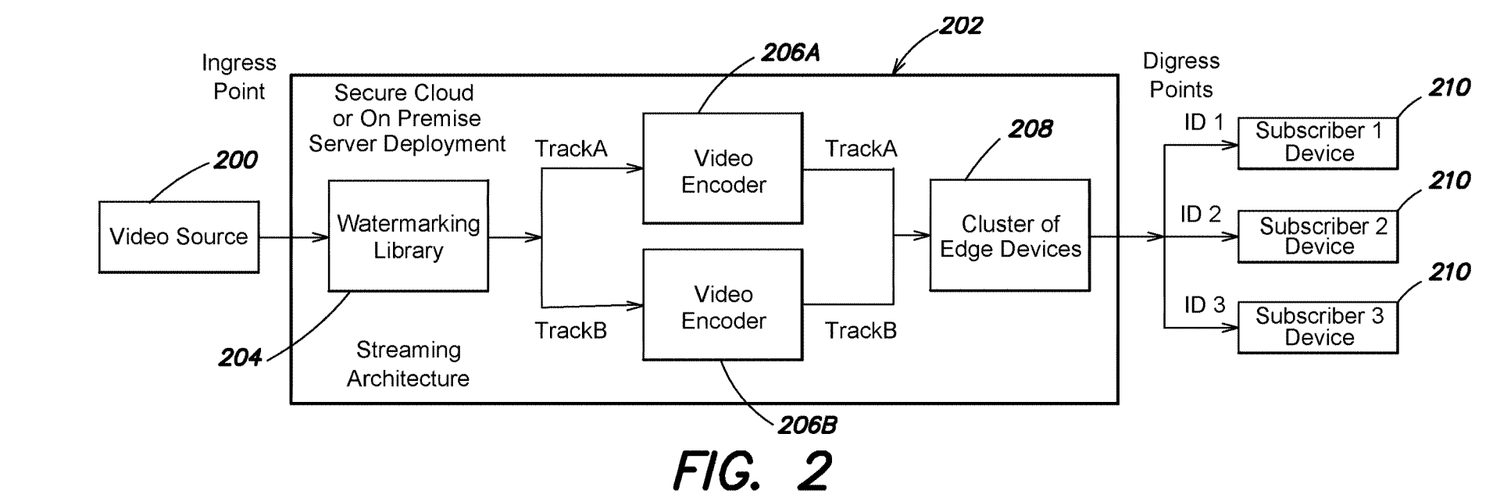
FIG. 2 illustrates an example implementation of the live media streaming architecture with real-time watermarking with a subscriber mark enabled.

Referring to FIG. 2, an example implementation of a live media streaming architecture with real-time watermarking with a subscriber mark enabled will now be described. A video source 200 provides uncompressed or compressed video to the streaming architecture 202, e.g., via software, hardware, or network interface. Ingress of the original digital media may come from any of a variety of sources, such as video on demand (VOD) sources, serial, or parallel digital delivery interfaces, or through live delivery over protocols like WebRTC, secure reliable transport (SRT), real-time streaming protocol (RTSP), real-time messaging protocol (RTMP), MPEG transport stream (MPEG-TS), or any other network delivery.

For each video frame that arrives into the streaming architecture 202, a watermarking library 204 provides, in one implementation, A and B versions of the input frame to the inputs of video encoders 206A and 206B (collectively, "206"). After processing the video frames, the video encoders 206 send the output to a cluster of edge devices 208 which processes user requests for video and delivers differently marked streams to different subscriber devices 210. Different respective combinations of the "A/B" versions are generated by each edge device in the cluster 208 and are provided to the subscriber devices based on the different subscriber identifiers. Further explanation of the different A/B versions and the watermarking process is provided below in connection with FIG. 4.

Egress of the watermarked content may go through any channel of an over-the-top (OTT) media delivery platform, while currently the lowest latency with widest support is achievable through WebRTC. An OTT platform is a service that enables delivery of live digital media streams, such as video, to any internet-enabled device.

In some implementations, the video encoder 206 may be present in two or more instances, as shown in FIG. 2 at 206A and 206B, in which each video encoder provides a differently watermarked stream as output. In some implementations, the video encoder 206 may be present in one instance that is modified in a way that it outputs two or more differently watermarked streams.

Figure 3:
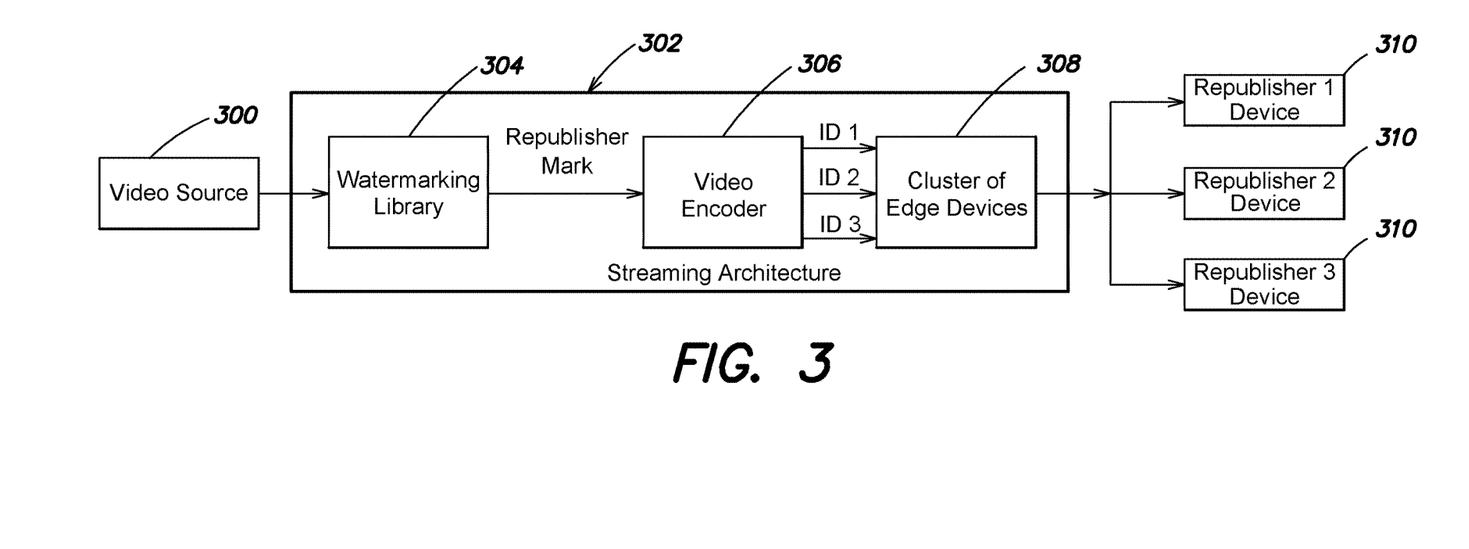
FIG. 3 illustrates an example implementation of the live media streaming architecture with real-time watermarking with a republisher mark enabled.

The edge devices 208 allow for fast and location-independent optimal access to the video streams sent to the subscribers. In FIG. 2, each edge device implements an algorithm which takes subscriber information for a subscriber and license conditions as input and provides a binary sequence (ABAA . . . BBAB) as output. This respective binary sequence for each subscriber is used to generate the video stream transmitted to that subscriber. In FIG. 3, described in more detail below, a cluster of edge devices transmits the streams to republisher devices. In some implementations, the edge devices also can handle creating a unique sequence of packets resistant to packet loss, tampering, collusion, and other kinds of attack.

Referring to FIG. 3, an example implementation of a live video streaming architecture with real-time watermarking with a republisher mark enabled will now be described. A video source 300 provides uncompressed or compressed video to the streaming architecture 302, e.g., via software, hardware, or network interface. For each video frame that arrives into the streaming architecture 302, a watermarking library 304 outputs a watermarked version of the input frame to an input of a video encoder 306 based on a watermark for the republisher. The video encoder 306 sends the outputs for the different republishers to a cluster of edge devices 308 which process user requests for video and deliver differently marked streams to different republisher devices. Similar to video encoder 206 in FIG. 2, in some implementations, the video encoder 306 may be present in two or more instances, in which each video encoder provides a differently watermarked stream for each republisher as output. In some implementations, the video encoder 306 may be present in one instance as shown in FIG. 3.

Subscriber devices (e.g., 108, 110, 210) and is some implementations a republisher device (e.g., 310) may be any client computing device that may be used to receive the stream of digital media. Such devices typically have an application installed through which digital media is presented on the device, and which processes media data received by the device. The subscriber device can, for example, be any device capable of participating in an over-the-top (OTT) platform. Example subscriber devices include but are not limited to a personal computer, a mobile smartphone, a television, a set-top box, a game console, or any other device capable of receiving and decoding live digital media streams.

The combination of video source, other server computers, and edge devices as shown in FIGS. 1 through 3 for providing live streaming to subscriber devices can be implemented in a variety of ways. In some implementations, such a system can be implemented in a cluster of computers, which can be modified as described herein to support such features, as described in U.S. Pat. Nos. 8,019,878, 8,024,469, 8,171,145, 8,166,181, and 8,019,867, and U.S. Published Patent Applications 2019/0320004, 2019/0320014, and 2019/0028465, which are hereby incorporated by reference.

Figure 4:
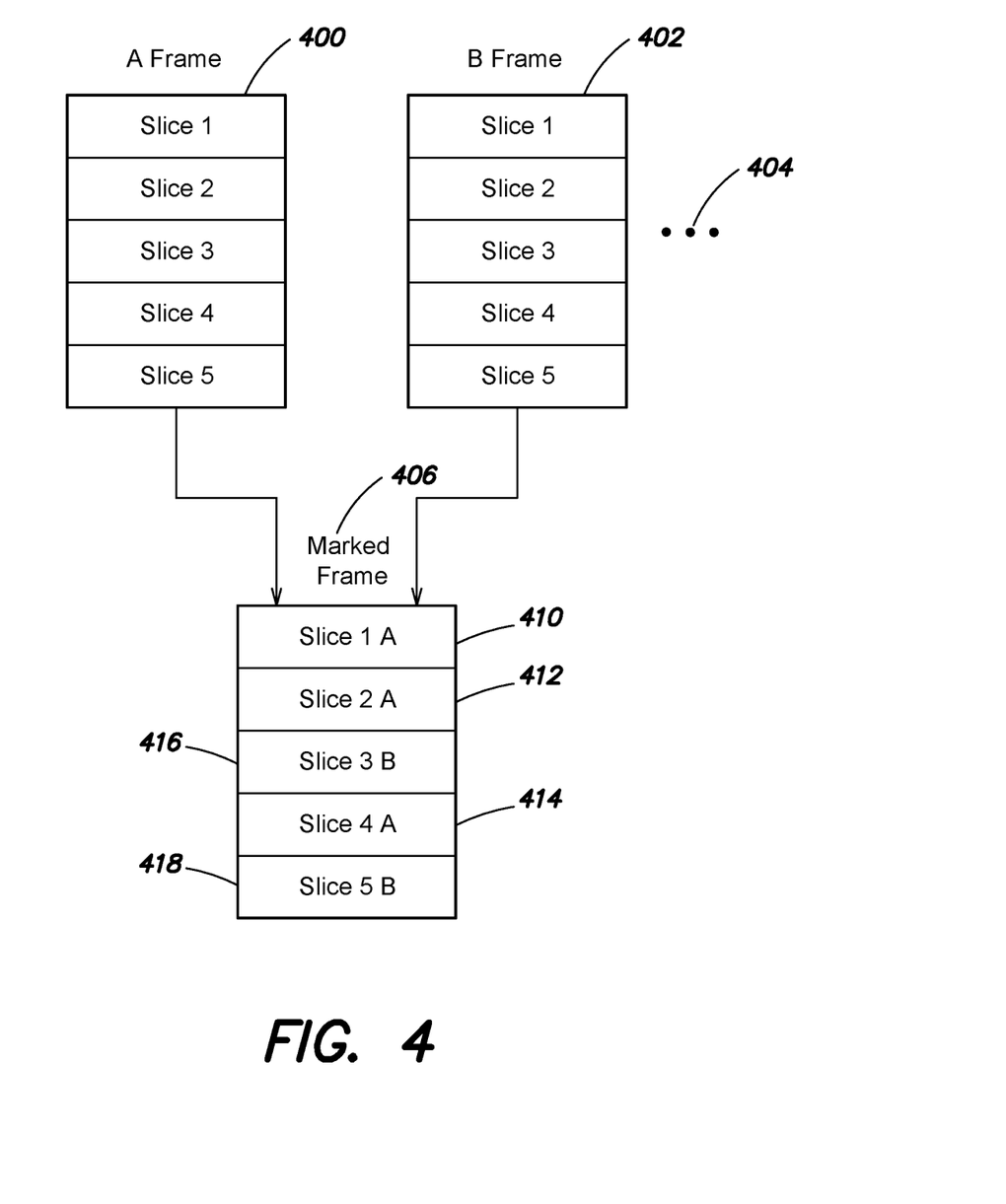
FIG. 4 illustrates an example implementation of A/B switching for watermarking on the frame and subframe levels.

Referring now to FIG. 4, an example implementation of the watermarking will now be described in more detail. This implementation enables either frame level or subframe level watermarking. A frame has a watermark embedded in at least two variants, frame A 400 and frame B 402. Although A and B are used to indicate the possibility of switching between the two variant streams, more than two variations, i.e., A/B/C . . . , also are applicable to all implementations described herein, as indicated by ellipsis 404. Each slice or other part of a frame can include the watermark. Thus, an A frame 400 is generated with version A of the watermark embedded; a B frame 402 is generated with version B of the watermark embedded. Each marked frame 406, or set of marked frames, has a different sequence of the A and B versions embedded, and this sequence can be different per subscriber or per republisher. Thus, within each marked frame 406, some slices (e.g., 410, 412, 414) are encoded with version A of the watermark, and some slices (e.g., 416, 418) are encoded with version B of the watermark, as shown in FIG. 4. In some implementations, the different versions A and B are applied to an entire frame, and then in a set of marked frames, some frames are encoded with version A of the watermark, and some frames are encoded with version B of the watermark.

The watermarking library can be integrated in the system via a unified watermarking application programming interface (API) specified by the ultra-high definition television (UHDF) specification, thus allowing any watermarking library complying with the specification to be used. In general, the watermarking library modifies an input frame or subframe given a payload (data, called the watermark). One or more bits of the payload may be applied to a single frame such that the entire payload may be spread over several frames. The watermarking library may perform any kind of modification based on the payload that can be detected. As an example, the luminance of each pixel of a frame of video can be increased or decreased by a bit. A and B versions as described above can be different modifications based on the same payload. In some implementations an identifier (e.g., of a subscriber or publisher) is encoded as the sequence of A and B versions of the watermark.

In some implementations, a watermark is visible. In some implementations, a watermark is invisible. In some implementations, both visible and invisible watermarks can be included. The watermark can be added at a frame level and even a subframe level. In some implementations, a watermark is informative, such as logo. In some implementations, a watermark is forensic, allowing for a reliable identification of a subscriber or a republisher. The watermark can carry side information, e.g., metadata, regarding the watermarked digital media. In some implementations, the watermark is inserted in the baseband domain. In some implementations, the watermark is inserted in the compressed domain. The watermark can be inserted in an audio stream, or in a video streams, or in other digital media streams such as metadata or still images, or in a combination of one or more digital media streams. The watermark can be designed to identify a subscriber, where a subscriber is someone who acquired permission to view a stream, such as through an authentication or pay per view system. The watermark can be designed to identify a republisher, where a republisher is someone who acquired permission to republish a stream to subscribers, such as through an authentication or pay per view system.

Watermark could be used to provide additional services not connected to identifying the owner of the content. Such services might include but not limited to additional side information available on the second screen of the playback device or advertisement messages available during watching the watermarked stream.

In contrast to HLS and DASH and other systems in which the granularity of watermark insertion is limited to segments of a digital media stream, this live video streaming architecture allows the watermark to be inserted in real time at the frame and even subframe level. The live streaming architecture can implement such watermarking in combination with UDP/WebRTC based video streaming protocols. By using A/B switching of watermarks, a straightforward and low latency way of inserting a watermark and encoding subscriber or republisher identifiers is provided. A/B switching at subframe boundaries also increases payload density. For example, if A/B switching occurs on frame boundaries and the watermark size is 64 bits, with 1 bit per frame, for additional reliability each payload bit is repeated several, e.g., three times, then the overall size of the watermark mark would be 192 frames or about 6.5 seconds with an average frame rate of 30 frames per second. Allowing the switching to occur on the subframe level decreases the extraction time multiplied by the number of slices allowed per frame. For example, if a frame has four slices then the extraction time decreases to about 1.6 seconds. In some implementations, because the WebRTC architecture is built upon the UDP protocol, which does not ensure that all packets sent are received, the watermarking insertion and watermarking extraction should not rely on all bits of the payload being capable of being available and decoded. Thus, redundancy and error correction code usage should be implemented.

Figure 5:
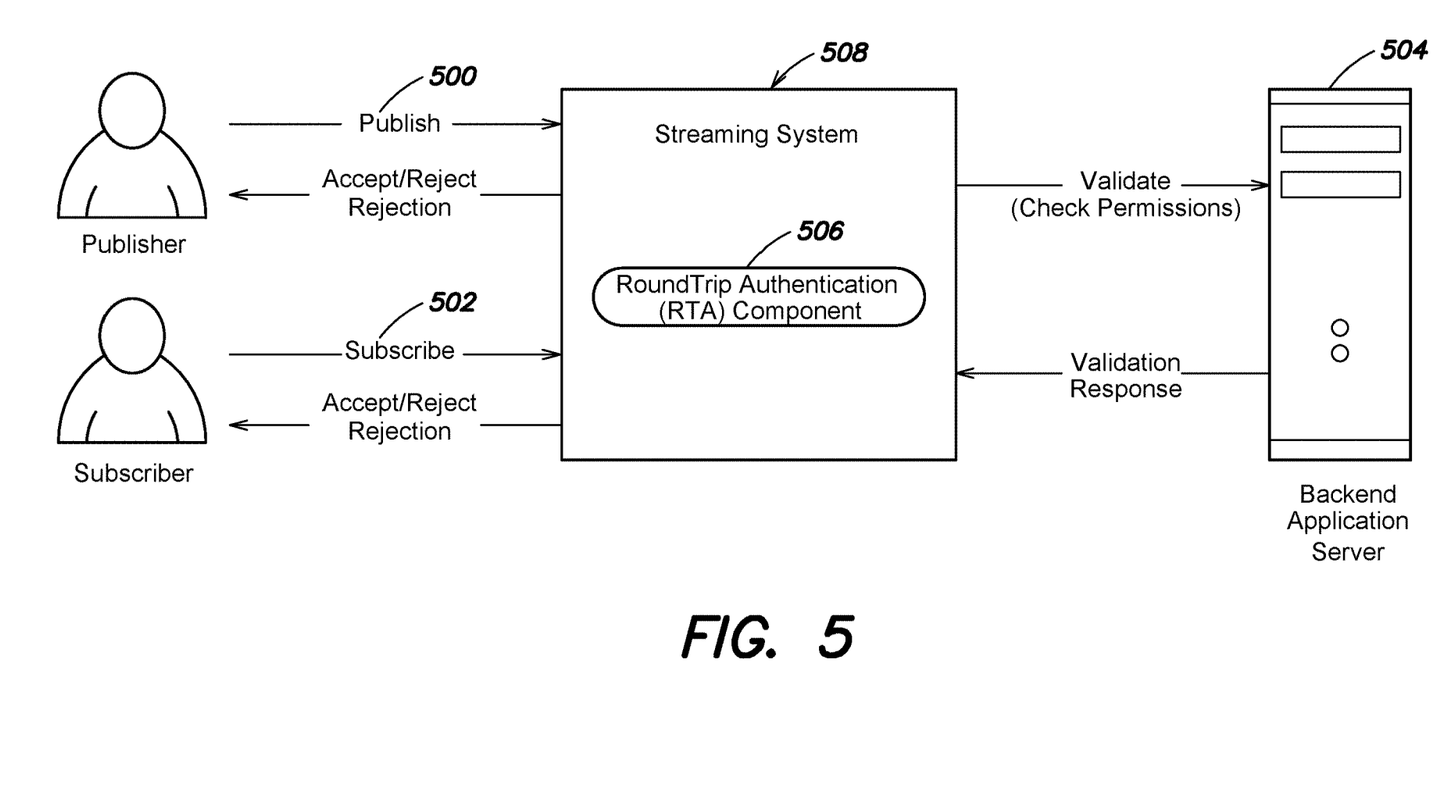
FIG. 5 is a high-level diagram of round-trip authentication.

Referring now to FIG. 5 user authentication and a subscriber identifier generation will now be described. The streaming system 508 can include a custom Round Trip Authentication (RTA) component 506 to validate the publish and subscribe requests made by the users while concurrently retrieving the watermark to add to the viewers' live streams. The requests are intercepted by the RTA component 506. Each request carries authentication credentials, which are supplied to a user's client by a backend application server 504, that are validated by the RTA component 506 against the same server 504, e.g., through a representational state transfer (REST) API. In this way, both publishers and subscribers will provide those credentials to the streaming system 508 when making a publish request 500 or a subscribe request 502, and the RTA component 506 of the streaming system 508 validates them against the backend application server 504. The streaming system allows the request (500 or 502) only if the credentials are valid. In some implementations, for subscribing requests, the backend application server 504 can provide the watermark to use for that specific subscriber. In such implementations, it is possible to ensure that only authorized users can use the video streaming system, and there will not be a need for an additional call to retrieve the watermark to use for each viewer.

Figure 6A:
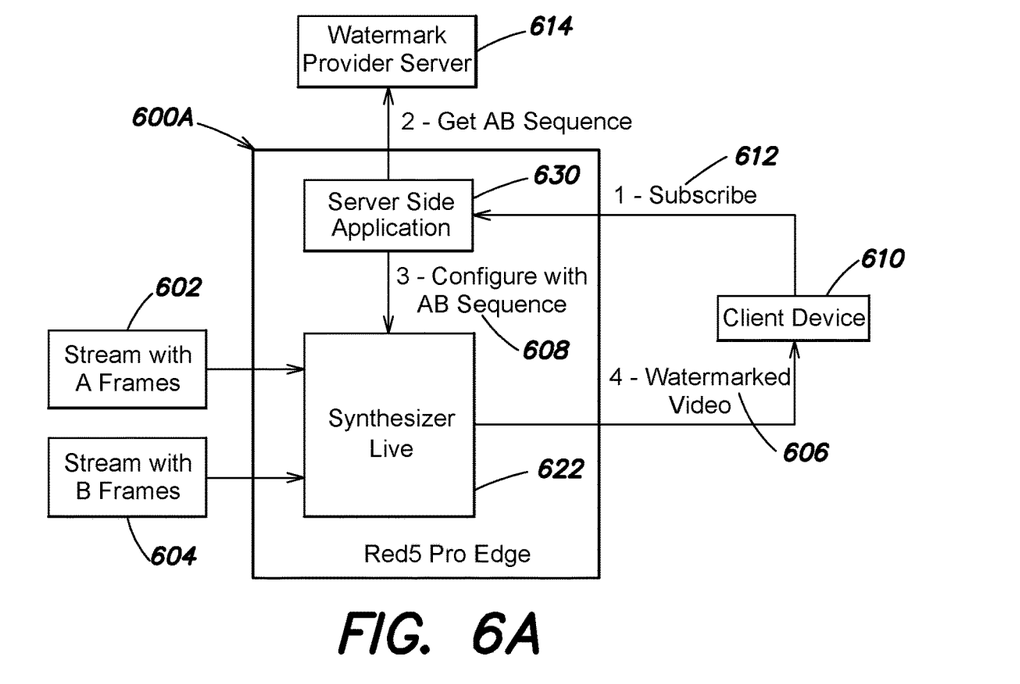
FIGS. 6A and 6B are example implementations of an edge located stream switcher and synthesizer that allow for unique identifier generation.
Figure 6B:
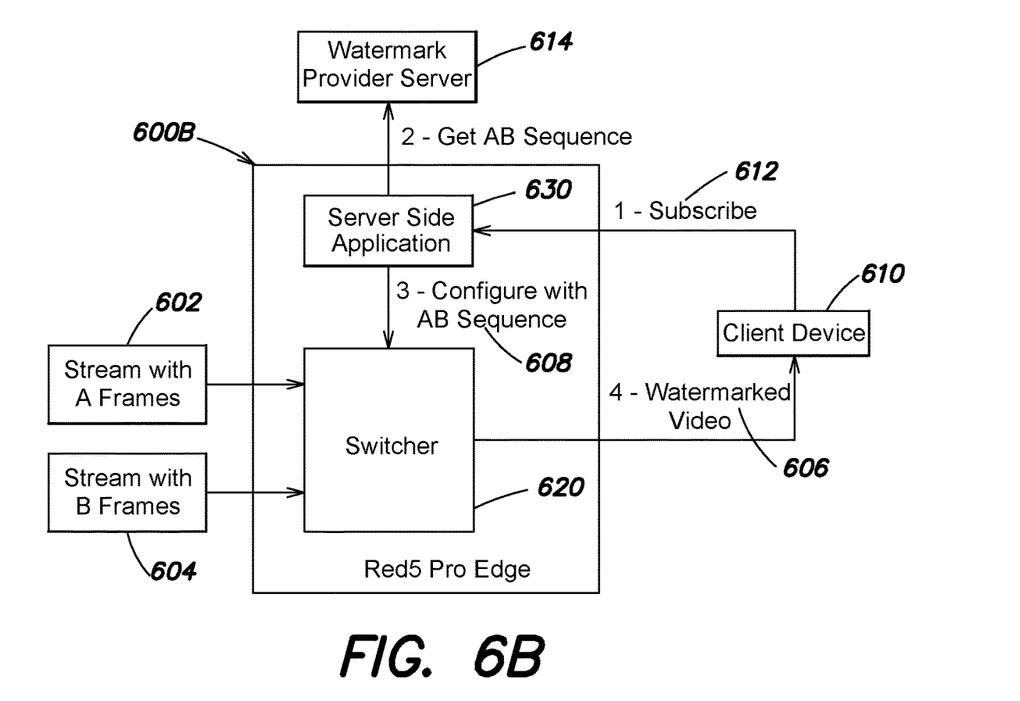

Referring now to FIGS. 6A and 6B an example implementation of an edge device-located stream switcher and synthesizer that allow for unique identifier generation will now be described. An edge device 600A or 600B in the video streaming system receives the A and B variant streams 602, 604 generated from a published stream and combines them according to a sequence 608 that is different for every viewer to provide a watermarked live stream that uniquely identifies a viewer associated with a client device 610. When a client device 610 associated with a subscriber sends a request 612 to watch the live stream, the edge device 600A, 600B uses a server side application 630 to interface with the watermark provider server 614 to receive the video packet sequence to use for that viewer. The edge device 600B (FIG. 6B) can use a switcher 620 to switch the subscribing viewer between the two A and B live streams according to the watermark sequence or the edge device 600A can us a synthesizer 622 to synthesize a new live stream 606 using the video packets from the A and B variants and the watermark sequence. For both cases, the process will happen on the server side and, as the viewer is watching the live stream, the edge device 600A, 600B sends a video 606 generated using the packets from the appropriate sequence. In this way, if a recording of the live stream is made available, it will be possible to process it to extract the A and B packets sequence and map it to a client device 610, and a user of that client device, from which it originated.

Figure 7:
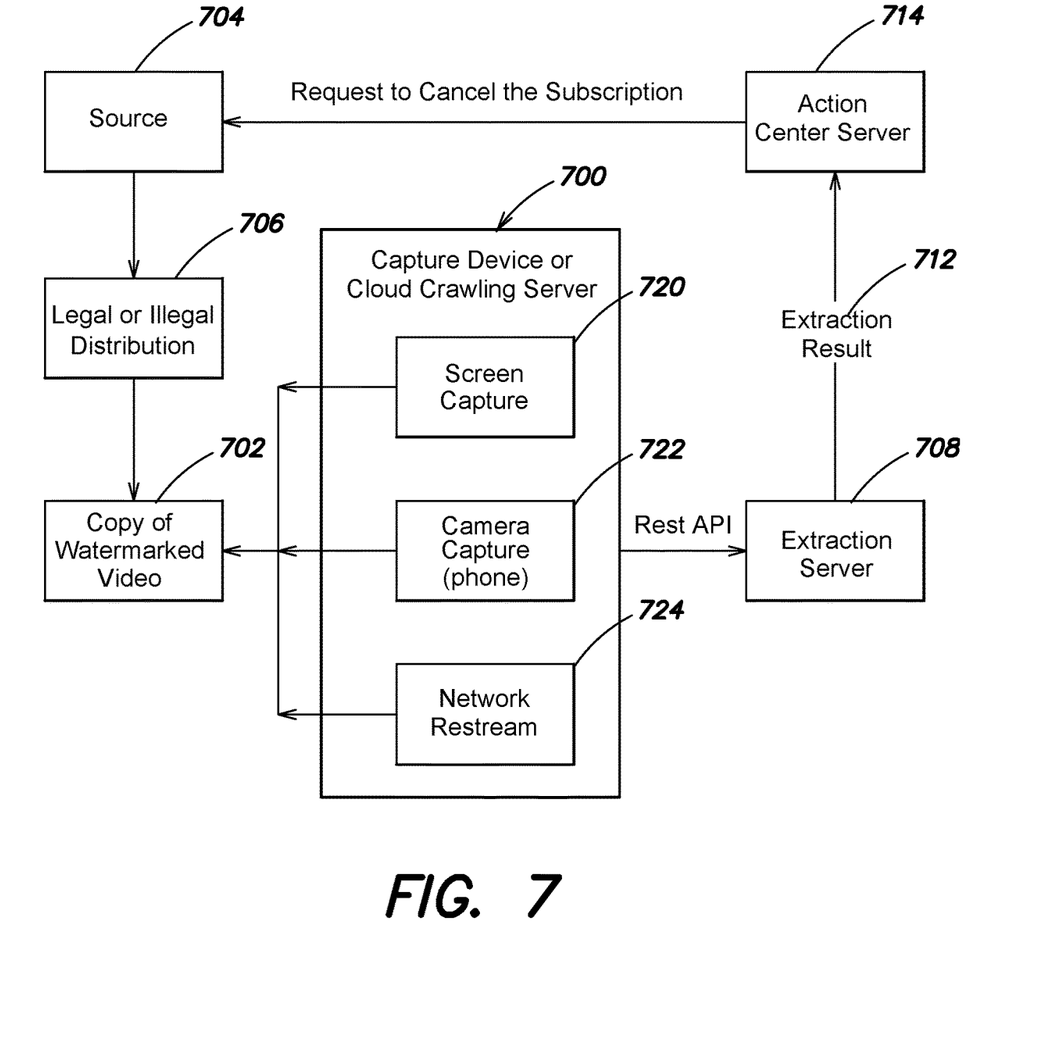
FIG. 7 illustrates an example implementation of an extraction service.

Referring now to FIG. 7, an example implementation of an extraction service will now be described. An extraction service generally would be used to process a suspect digital media stream to determine whether the suspect digital media stream is an authorized copy of an original. Such scenarios may arise if an authorized subscriber copies and transmits an otherwise authorized stream in an unauthorized way. For example, a web server may provide access by others to a stream authorized to be received and viewed by one individual. Or, a recorded copy of the stream may be made available on a computer network.

In an example implementation in FIG. 7, a capture device or "cloud crawling" server 700 may search for or may otherwise access a copy 702 of a watermarked video. The copy 702 watermarked video may be originated from a source 704 that is legally or illegally distributing it (shown at 706). The copy may be obtained through a process such as a screen capture 720, camera capture 722 such as by using a phone or other mobile device with a camera, or through a network restreaming process 724. Because of the watermarking, the original content origin, i.e., the subscriber device or republisher device that received that particular stream, can be identified. The capture device or crawling server 700 accesses an extraction server 708, providing a copy of one or more frames from the suspect digital media stream. The extraction server 708 extracts the watermark and provides the extraction result 712 to an action center server 714.

The action center server 714 is a computer system that can be entirely automated or may be semi-automated. The action center server stores or otherwise has access to the subscriber and watermarking information for each watermarked stream distributed by the live streaming system. Given the detected watermark information, the action center server identifies the corresponding subscriber device that received the digital media stream. Given the source of the suspect stream, the action center server determines whether the subscriber device was authorized to provide that stream to that source. If the distribution was determined to be unauthorized, some action can be taken to cancel, terminate or otherwise alter access to that stream by the subscriber device. In implementations described herein, where latency for media delivery is under 500 milliseconds (ms) and an extraction time is about five to fifteen seconds, an unauthorized live video stream can be quickly detected and terminated.

The extraction server 708 can be implemented as a computer program, herein called an extraction module, running on a server computer or a client computer. In some implementations, the extraction module may be implemented on a cloud service or as a standalone application with an application programming interface connection, such as the representational state transfer (REST) API, to such a cloud service. In some implementations, the extraction module may be provided in a form of software development kit or library which can be linked to other applications, allowing third parties to build applications with connection to the live streaming application with watermarking. Such a library or software development kit may be made available for a variety of operating systems such as, but not limited to the Windows, Linux, MacOS, iOS, and Android operating systems. The extraction module may be configured to be executed in a live mode, such as to process a suspected pirated stream. In some implementations, the suspect stream is redirected to the extraction server which processes the suspect stream live, or in an online mode. In some implementations, such as when video or audio quality is low or an attack is severe, a recording could be made and a more thorough investigation using the extraction server can be performed in an offline mode. The extraction server uses the complement of the watermarking library that inserts watermarks generated by the live streaming system to extract the inserted watermarks.

Figure 8:
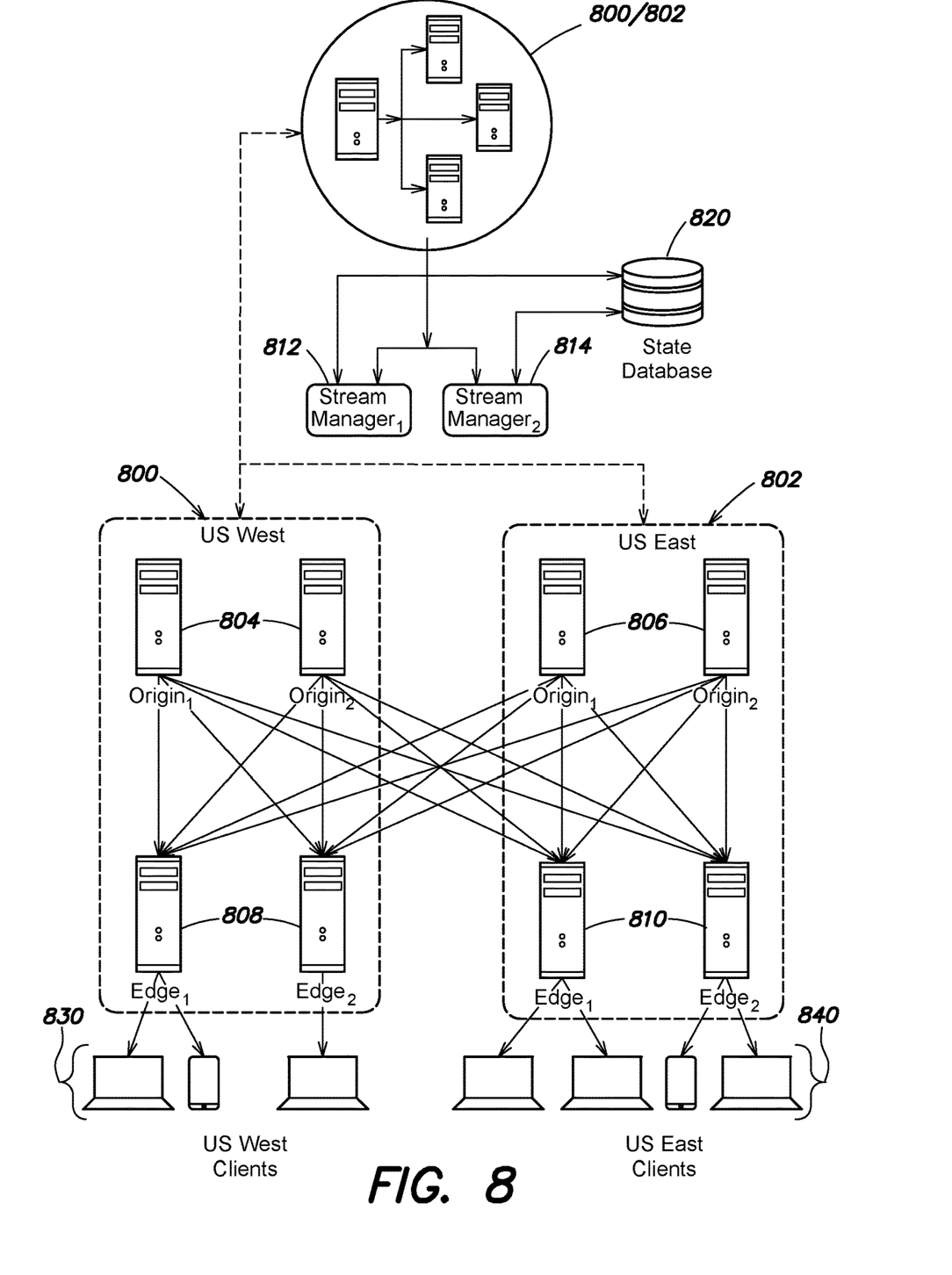
FIG. 8 is an example implementation of a network infrastructure capable of providing a service of live video streaming with watermarking enabled.

Referring now to FIG. 8, an example implementation of a network infrastructure capable of providing a service of live video streaming with watermarking enabled will now be described. The network infrastructure includes a set of clusters 800, 802 that are deployed in data centers in different regions, each cluster comprising origin devices 804, 806 and edge devices 808, 810. The network includes a set of load balanced stream managers 812, 814 that control the network and spin up or down new instances of origin devices and edge devices dynamically based on the current load or scheduled events and a database 820 to store the network's state. The live streams are published to the origin devices that make them available to the edge devices in the cluster. In this way, every edge device will have a copy of every live stream that it will make available to its subscribers at client devices 830, 840. Having a copy of the live streams on each edge device adds redundancy to the system because if any of the edge device instances failed, a viewer could quickly connect to another one to continue watching the live streams.

Figure 9:
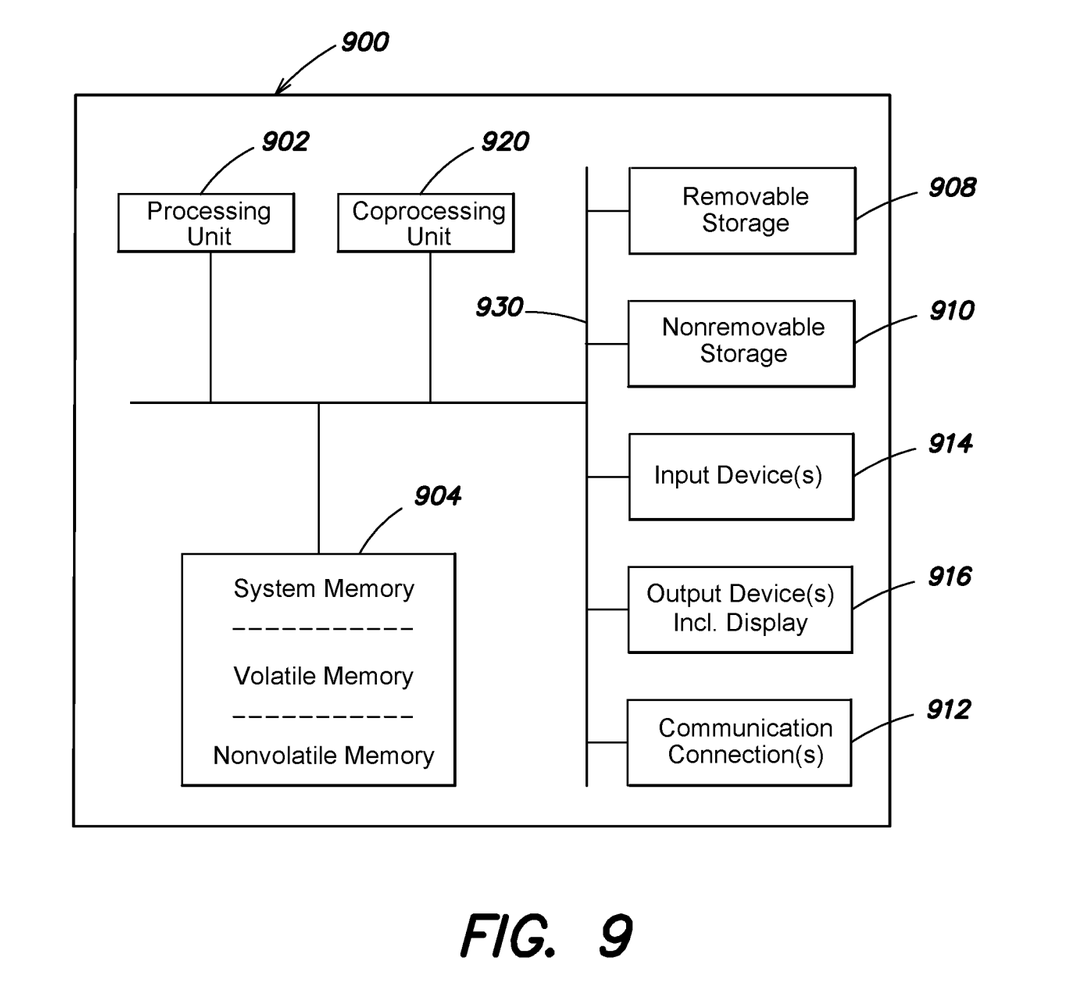
FIG. 9 is a block diagram of an example general-purpose computer.

Having now described several example implementations, FIG. 9 illustrates an example of a general-purpose computing device with which can be used to implement a node, user's device, client device, edge, relay, origin, stream manager, media server, transcoder, application server, or other computer system as described here, used in connection with providing a cluster of computers. This is only one example of a computer and is not intended to suggest any limitation as to the scope of use or functionality of such a computer. The system described above can be implemented in one or more computer programs executed on one or more such computers as shown in FIG. 9.

FIG. 9 is a block diagram of a general-purpose computer which processes computer program code using a processing system. Computer programs on a general-purpose computer typically include an operating system and applications. The operating system is a computer program running on the computer that manages and controls access to various resources of the computer by the applications and by the operating system, including controlling execution and scheduling of computer programs. The various resources typically include memory, storage, communication interfaces, input devices, and output devices. Management of such resources by the operating typically includes processing inputs from those resources.

Examples of such general-purpose computers include, but are not limited to, larger computer systems such as server computers, database computers, desktop computers, laptop, and notebook computers, as well as mobile or handheld computing devices, such as a tablet computer, handheld computer, smart phone, media player, personal data assistant, audio or video recorder, or wearable computing device.

With reference to FIG. 9, an example computer 900 comprises a processing system including at least one processing unit 902 and a memory 904. The computer can have multiple processing units 902 and multiple devices implementing the memory 904. A processing unit 902 can include one or more processing cores (not shown) that operate independently of each other. Additional co-processing units, such as graphics processing unit 920, also can be present in the computer. The memory 904 may include volatile devices (such as dynamic random-access memory (DRAM) or other random access memory device), and non-volatile devices (such as a read-only memory, flash memory, and the like) or some combination of the two, and optionally including any memory available in a processing device. Other memory such as dedicated memory or registers also can reside in a processing unit. This configuration of memory is illustrated in FIG. 9 by dashed line 904. The computer 900 may include additional storage (removable or non-removable) including, but not limited to, magnetically recorded or optically-recorded disks or tape. Such additional storage is illustrated in FIG. 9 by removable storage 908 and non-removable storage 910. The various components in FIG. 9 typically are interconnected by an interconnection mechanism, such as one or more buses 930.

A computer storage medium is any medium in which data can be stored in and retrieved from addressable physical storage locations by the computer. Computer storage media includes volatile and nonvolatile memory devices, and removable and non-removable storage devices. Memory 904, removable storage 908 and non-removable storage 910 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

The computer 900 may also include communications connection(s) 912 that allow the computer to communicate with other devices over a communication medium. Communication media typically transmit computer program code, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media include any non-wired communication media that allows propagation of signals, such as acoustic, electromagnetic, electrical, optical, infrared, radio frequency and other signals. Communications connections 912 are devices, such as a network interface or radio transmitter, that interface with the communication media to transmit data over and receive data from signals propagated through communication media.

The communications connections can include one or more radio transmitters for telephonic communications over cellular telephone networks, or a wireless communication interface for wireless connection to a computer network. For example, a cellular connection, a Wi-Fi connection, a Bluetooth connection, and other connections may be present in the computer. Such connections support communication with other devices, such as to support voice or data communications.

The computer 900 may have various input device(s) 914 such as various pointer (whether single pointer or multi-pointer) devices, such as a mouse, tablet and pen, touchpad and other touch-based input devices, stylus, image input devices, such as still and motion cameras, audio input devices, such as a microphone. The computer may have various output device(s) 916 such as a display, speakers, printers, and so on, also may be included. These devices are well known in the art and need not be discussed at length here.

The various storage 910, communication connections 912, output devices 916 and input devices 914 can be integrated within a housing of the computer, or can be connected through various input/output interface devices on the computer, in which case the reference numbers 910, 912, 914 and 916 can indicate either the interface for connection to a device or the device itself as the case may be.

An operating system of the computer typically includes computer programs, commonly called drivers, which manage access to the various storage 910, communication connections 912, output devices 916 and input devices 914. Such access can include managing inputs from and outputs to these devices. In the case of communication connections, the operating system also may include one or more computer programs for implementing communication protocols used to communicate information between computers and devices through the communication connections 912.

Each component (which also may be called a "module" or "engine" or the like), of a computer system and which operates on one or more computers, can be implemented as computer program code processed by the processing system(s) of one or more computers. Computer program code includes computer-executable instructions or computer-interpreted instructions, such as program modules, which instructions are processed by a processing system of a computer. Such instructions define routines, programs, objects, components, data structures, and so on, that, when processed by a processing system, instruct the processing system to perform operations on data or configure the processor or computer to implement various components or data structures in computer storage. A data structure is defined in a computer program and specifies how data is organized in computer storage, such as in a memory device or a storage device, so that the data can accessed, manipulated, and stored by a processing system of a computer.

It should be understood that the subject matter defined in the appended claims is not necessarily limited to the specific implementations described above. The specific implementations described above are disclosed as examples only.

What is claimed is:

1. A live media streaming architecture with real-time watermarking, comprising:
   an origin device, comprising a first processing unit and a first computer storage medium, configured to receive a real-time live digital media stream from a publisher device associated with a publisher over a first one or more computer networks;
   a plurality of edge devices, wherein each edge device in the plurality of edge devices comprises a respective second processing unit and a respective second computer storage medium and wherein each edge device in the plurality of edge devices is configured to deliver real-time live digital media streams to respective subscriber devices assigned to the edge device and connected to the edge device over a second one or more computer networks;

a third one or more computer networks interconnecting the origin device with the plurality of edge devices;

wherein the origin device is configured to stream the real-time live digital media stream through the third one or more computer networks to the plurality of edge devices using a real-time streaming communication protocol allowing direct access to image data within each individual frame of the real-time live digital media stream;

the third one or more computer networks comprising a processor having a first input configured to receive the real-time live digital media stream from the origin device and a second input configured to receive a payload for use in creating a watermark, wherein the processor includes a watermarking module, comprising computer program instructions that when processed by the processor configures the processor to:

apply a respective watermark, including at least a portion of the payload, to each individual frame of the real-time live digital media stream in at least two distinct forms for the frame, such that a plurality of differently watermarked real-time live digital media streams are produced, and stream the plurality of differently watermarked real-time live digital media streams using the real-time streaming communication protocol over the third one or more computer networks to each edge device; and wherein each edge device in the plurality of edge devices is further configured to:

receive the plurality of differently watermarked real-time live digital media streams from the processor;

generate a respective uniquely watermarked real-time live digital media stream for each subscriber device by defining a respective unique sequence of individual frames or subframes selected from among the plurality of differently watermarked real-time live digital media streams based on respective information associated the subscriber device, and combining the selected individual frames or subframes from among the plurality of differently watermarked real-time live digital media streams into the respective uniquely watermarked real-time live digital media stream for the subscriber device;

stream the respective uniquely watermarked real-time live digital media streams as real-time live digital media streams to the respective different subscriber devices assigned to the edge device, whereby each real-time live digital stream transmitted by the plurality of edge devices is uniquely associated with the respective subscriber device.

2. The live media streaming architecture of claim 1, wherein the watermarking module, to apply the watermark to the real-time live digital media stream, introduces less than 500 milliseconds of latency to delivery of the real-time live digital media stream through the third one or more computer networks.

3. The live media streaming architecture of claim 1, wherein the watermarking module generates a first version of a subframe with a first watermark and a second version of a subframe with a second watermark, and wherein the edge device delivers a first stream to a first subscriber device with a first sequence of versions of subframes and a second stream to a second subscriber device with a second sequence of versions of subframes different from the first sequence.

4. The live media streaming architecture of claim 1, wherein the watermarking module generates a first version of a frame with a first watermark and a second version of a frame with a second watermark, and wherein the edge device delivers a first stream to a first subscriber device with a first sequence of versions of frames and a second stream to a second subscriber device with a second sequence of versions of frames different from the first sequence.

5. The live media streaming architecture of claim 1, wherein the real-time live digital media stream comprises an audio stream, wherein a frame of the audio stream is marked with the watermark.

6. The live media streaming architecture of claim 1, wherein the real-time live digital media stream comprises a video stream, wherein a frame of the video stream is marked with the watermark.

7. The live media streaming architecture of claim 1, wherein the real-time live digital media stream comprises both a video stream and an audio stream, wherein frames of at least the video stream are marked with the watermark.

8. The live video streaming architecture of claim 1, wherein the payload for the watermark carries data indicating at least one of a republisher, a subscriber, or metadata about the real-time live digital media stream.

9. A live media streaming architecture with real-time watermarking, comprising:

a plurality of origin devices, wherein each origin device in the plurality of origin devices comprises a respective origin server computer including a first processing unit, a first computer storage medium, and computer program instructions processed by the first processing unit to configure operations of the origin server computer, and wherein each origin device in the plurality of origin devices is configured to receive at least one respective real-time live digital media stream over a first one or more computer networks from one or more respective publisher devices assigned to the origin device, wherein the publisher devices provide at least one respective real-time live digital media stream from at least one respective publisher;

a plurality of edge devices, wherein each edge device in the plurality of edge devices comprises a respective edge server computer including a second processing unit, a second computer storage medium, and computer program instructions processed by the second processing unit to configure operations of the edge server computer, and wherein each edge device in the plurality of edge devices is configured to deliver respective real-time live digital media streams to one or more respective subscriber devices assigned to the edge device and connected to the edge device over a second one or more computer networks;

a third one or more computer networks interconnecting the plurality of origin devices with the plurality of edge devices;

wherein each origin device in the plurality of origin devices is configured to stream the at least one respective real-time live digital media stream received from the one or more respective publisher devices through the third one or more computer networks, for access by the plurality of edge devices, using a real-time streaming communication protocol allowing direct access to image data within each individual frame of a real-time live digital media stream;

the third one or more computer networks comprising a watermarking server computer including a third processor, third computer storage, and computer program instructions processed by the third processor to configure operations of the watermarking server computer, the watermarking server computer having a first input configured to receive real-time live digital media streams from the plurality of origin devices and a second input configured to receive a respective payload for each publisher for use in creating watermarks, wherein the third computer storage of the watermarking server computer includes a watermarking module comprising computer program instructions that when processed by the third processor configures the third processor to:

apply a respective watermark, including at least a portion of the payload for the respective publisher, to each individual frame of each real-time live digital media stream in at least two distinct forms for the frame, such that a respective plurality of differently watermarked real-time live digital media streams are produced for each of the real-time live digital media streams, and stream the plurality of differently watermarked real-time live digital media streams using the real-time streaming communication protocol over the third one or more computer networks to each edge device in the plurality of edge devices; and wherein each edge device in the plurality of edge devices is further configured to:

receive, from the processor the plurality of differently watermarked real-time live digital media streams for each real-time live digital media stream to be streamed to the respective subscriber devices assigned to the edge device;

generate a respective uniquely watermarked real-time live digital media stream for each subscriber device by defining a respective unique sequence of individual frames or subframes selected from among the plurality of differently watermarked real-time live digital media streams based on respective information associated the subscriber device, and combining the selected individual frames or subframes from among the plurality of differently watermarked real-time live digital media streams into the respective uniquely watermarked real-time live digital media stream for the subscriber device;

stream the respective uniquely watermarked real-time live digital media streams as real-time live digital media streams to the respective different subscriber devices assigned to the edge device, whereby each real-time live digital stream transmitted by the plurality of edge devices is uniquely associated with the respective subscriber device.

10. The live media streaming architecture of claim 9, wherein the watermarking module, to apply the watermark to the real-time live digital media streams, introduces less than 500 milliseconds of latency to delivery of the real-time live digital media streams through the third one or more computer networks.

11. The live media streaming architecture of claim 9, wherein the watermarking module generates a first version of a subframe with a first watermark and a second version of a subframe with a second watermark, and wherein the edge device delivers a first stream to a first subscriber device with a first sequence of versions of subframes and a second stream to a second subscriber device with a second sequence of versions of subframes different from the first sequence.

12. The live media streaming architecture of claim 9, wherein the watermarking module generates a first version of a frame with a first watermark and a second version of a frame with a second watermark, and wherein the edge device delivers a first stream to a first subscriber device with a first sequence of versions of frames and a second stream to a second subscriber device with a second sequence of versions of frames different from the first sequence.

13. The live media streaming architecture of claim 9, wherein at least one of the real-time live digital media streams comprises an audio stream, wherein a frame of the audio stream is marked with the watermark.

14. The live media streaming architecture of claim 9, wherein at least one of the real-time live digital media streams comprises a video stream, wherein a frame of the video stream is marked with the watermark.

15. The live media streaming architecture of claim 9, wherein at least one of the real-time live digital media streams comprises both a video stream and an audio stream, wherein frames of at least the video stream are marked with the respective watermark.

16. The live video streaming architecture of claim 9, wherein the respective payload for each watermark carries data indicating at least one of a republisher, a subscriber, or metadata about the respective real-time live digital media stream.

* * * * *

UNITED STATES PATENT AND TRADEMARK OFFICE
CERTIFICATE OF CORRECTION

PATENT NO. : 12,273,601 B2
APPLICATION NO. : 17/550472
DATED : April 8, 2025
INVENTOR(S) : Davide Lucchi et al.

Page 1 of 1

It is certified that error appears in the above-identified patent and that said Letters Patent is hereby corrected as shown below:

In the Claims

In Column 12, Line 26, in Claim 8, delete "live video" and insert -- live media --.

In Column 14, Line 45, in Claim 16, delete "live video" and insert -- live media --.

Signed and Sealed this
Tenth Day of June, 2025

Coke Morgan Stewart
*Acting Director of the United States Patent and Trademark Office*